W. Furley,
Barrel Roller.
N° 6,826. Patented Oct 30 1849.
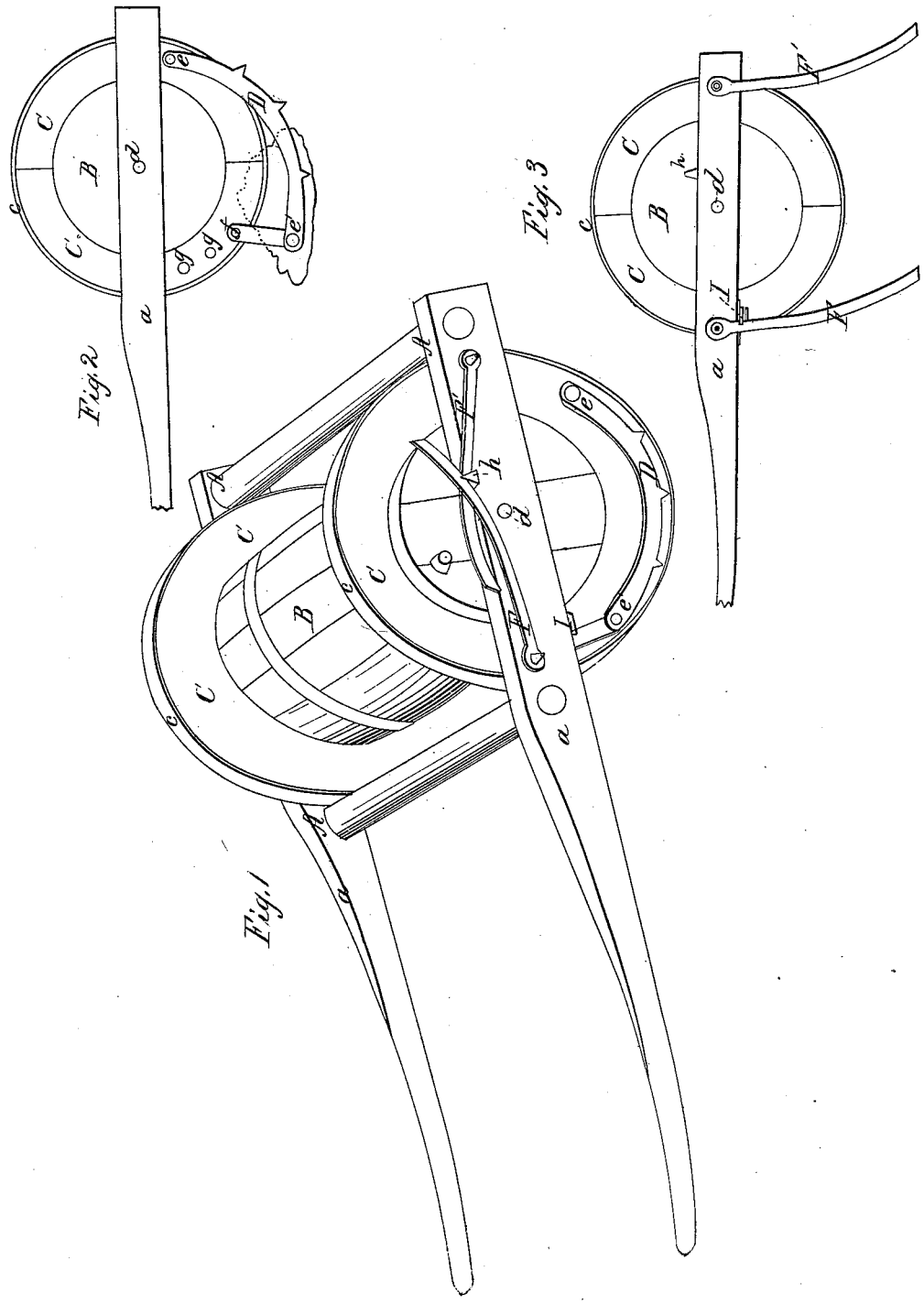

UNITED STATES PATENT OFFICE.

WILLIAM FURLEY, OF SMITHSBURGH, MARYLAND.

BARREL-CARRIAGE.

Specification of Letters Patent No. 6,826, dated October 30, 1849.

*To all whom it may concern:*

Be it known that I, WILLIAM FURLEY, of Smithsburgh, in the county of Washington and State of Maryland, have invented certain new and useful Improvements in Carriages for the Transportation of Liquids, of which the following is a full, clear, and exact description, reference being had to the accompanying drawing, making part of this specification, in which—

Figure 1 is a perspective view, and Figs. 2 and 3 side views of my improved barrel carriage.

In the drawing A is the frame of the carriage. It is formed of two longitudinal pieces *a a* which act as shafts in one horse machines, connected by suitable cross ties and braces. Within this frame revolves the barrel shaped vessel B built of staves securely hooped. At each extremity it is surrounded by fellies C forming wheels on which the machine travels, and which are bound together by suitable iron tires *c, c*. To the center of each head of the barrel a pivot *d*, is secured, which turns in the longitudinal pieces *a a* of the frame; these pivots serve as axles for the wheels, and on them the barrel shaped vessel B revolves. The machine thus constructed may be of any required dimensions, and answers for the mere transportation of liquids, but is defective in two particulars; first, in large carriages where the barrel has nearly as great a diameter as the wheels it will come in contact with inequalities of the rough ground over which it is frequently necessary to drag the carriage in procuring water from streams; and second, it is impossible to turn the barrel to raise it out, or to pour from its bung without moving the whole carriage backward or forward on the ground.

To obviate the first objection, I have attached an arc D of wood or metal to the outer side of each wheel. This arc is hinged at one extremity (*e*) to the felly of the wheel, to its opposite extremity (*e'*) is hinged one end of a link E the opposite end of which is pierced with a hole through which a pin *f* passes to secure it to the felly. In passing over level ground the arcs occupy the position in which they are represented in Fig. 1, but, if any obstacle presents itself, over which it is necessary the barrel shall pass, the arcs are moved into the position represented in Fig. 2, in which they are secured by thrusting the pin *f* into one of the holes *g* in the felly nearer the hinder extremity of the arc, the arcs now projecting beyond the wheel tires will raise the carriage in its progressive motion, and the barrel will clear the obstacle.

To enable one to rinse and tip the barrel without moving the carriage backward or forward, I have added to each side of the frame work of my carriage two hinged legs F, F' which when not in use can be supported on the side of the carriage by a cleat (*h*) attached to the framing. A sliding stop I is also attached to the under side of the frame immediately succeeding the hinge of the foremost leg.

When it is necessary to leave the barrel shaped vessel (B) in such a position that it can be easily turned without changing its position with respect to the surface of the ground on which it stands, the lower extremities of the hinged legs (F, F',) are thrown forward and catch in the ground, while the animal still drawing the carriage forward causes it to rise in a circular arc, of which the lower ends of the legs are the centers, until its further progression is prevented by the front legs F coming in contact with the stops I, and the carriage rests upon the legs, (Fig. 3) the wheels being at a sufficient distance from the surface of the ground to allow the barrel to be turned in any required position.

The hinged legs could also be employed to surmount obstacles; when used for this purpose the sliding stops must be shoved inward beneath the frame work, and out of the way of the legs. The carriage in its progressive motion would then rise and fall in a circular arc, the center of which is the lower extremity of the hinged legs.

By these arrangements the machine can be applied to the conveyance of liquids over extremely irregular ground, and when at rest can be tipped in any required position either to discharge its contents or to rinse it out.

What I claim as my invention and desire to secure by Letters Patent, is—

The combination of the arcs D and hinged legs F F,' with a barrel carriage substantially in the manner, and for the purpose herein set forth.

In testimony whereof I have hereunto subscribed my name.

WILLIAM FURLEY.

In presence of—
DAVID ROOP,
P. H. WATSON.